United States Patent

Fedorov et al.

[11] 3,893,327
[45] July 8, 1975

[54] RADIAL-SWAGING MACHINE

[76] Inventors: Nikolai Alexandrovich Fedorov,
ulitsa Kardasheva 2, kv. 24; Leonid Andreevich Butenko, ulitsa akademika Karpinskogo, 1, kv. 12; Vadim Vladimirovich Kazak, ulitsa Kirova, 24, kv. 47, all of Voronezh, U.S.S.R.

[22] Filed: Sept. 20, 1973

[21] Appl. No.: 399,118

[52] U.S. Cl. .................................................. 72/402
[51] Int. Cl. ............................................. B21d 41/04
[58] Field of Search ...... 72/399, 402, 450; 74/99 R, 74/101, 103; 29/237, 282

[56] References Cited
UNITED STATES PATENTS

| | | | |
|---|---|---|---|
| 565,257 | 8/1896 | Boyd | 72/402 |
| 2,562,644 | 7/1951 | Saxer | 72/402 |
| 3,415,105 | 12/1968 | Brown | 72/402 |
| 3,416,352 | 12/1968 | Ribback | 72/402 |

FOREIGN PATENTS OR APPLICATIONS

| | | | |
|---|---|---|---|
| 1,425,859 | 3/1965 | France | 72/402 |

*Primary Examiner*—C. W. Lanham
*Assistant Examiner*—M. J. Keenan

[57] ABSTRACT

The machine in which the spindle adapted for reciprocating motion incorporates radial slots to accomodate slides whose ends facing the spindle axis are connected to striking heads acting on the billet being swaged, while the other end of each slide is pivotally connected to the lever whose turning axle is fixed on the bed. The levers make the slides reciprocating in the slots when the spindle is oscillating. This machine is relatively simple in design, not expensive to manufacture, and practically noiseless.

3 Claims, 6 Drawing Figures

RADIAL-SWAGING MACHINE

The present invention relates to metal working by pressure and more specifically to radial-swaging machines.

There are known radial-swaging machines comprising a bed which mounts a spindle with an axial passage for the advancement of a billet being swaged. This spindle is connected to a drive adapted to bring oscillating motion to the spindle. The above spindle is provided with radial slots to accomodate slides. Fixed to the end of each slide facing the spindle axis is a striking head acting on said billet in the course of its treatment. Fixed to the opposite end of each slide is a component having a shaped surface.

The bed carries a holder embracing the spindle and mounting on its inner surface the rollers which are in constant contact with the shaped surface of the slide.

The slides are spring-loaded to be in constant contact with the rollers of the holder.

The holder with rollers, the shaped surface of the slide component and springs make up a mechanism imparting reciprocating motion to the slide in the course of the oscillating motion of the spindle.

The mechanisms bringing reciprocating motion to the slides in the known machines are difficult to manufacture because of high accuracy needed.

In operation, the rollers and the shaped surfaces of slide components are quick to wear as they take the entire load brought to bear on the slides when the billet is being swaged. Moreover, machines incorporating such a mechanism for bringing reciprocating motion to the slides are known for their excessive noise level with its negative effects on attending personnel.

The object of the present invention is to provide a machine which is of a comparatively low cost to manufacture.

Another object of the present invention is to increase the service life of the machine.

One more object of the present invention is to reduce noise level of the operating machine.

These and other objects are achieved by provision of a radial-swaging machine wherein a spindle adapted for oscillating motion and having an axial passage for the advancing billet being swaged incorporates radial slots to accomodate slides whose ends facing the spindle axis are connected to the striking heads acting on said billet while the other ends thereof are adapted to cooperate in the course of the oscillating motion of the spindle with a mechanism bringing reciprocating motion to these slides, according to the invention said mechanism comprises levers whose number is equal to that of the slides, each of these levers positioned adjacently to the corresponding slide and with its one end is pivotally connected to the latter slide while with the other is pivotally linked with the bed of the machine.

Conveniently the end of each lever is linked with the bed of the machine through an eccentric adapted for adjusting the position of the slide in the course of billet treatment and having an individual drive.

This type of the lever-to-bed linkage makes it possible to produce asymmetrical parts with various cross-sectional dimensions.

Favourably the end of each lever is linked with the bed of the machine through an eccentric, whereas all these eccentrics are kinematically connected to each other and to a common drive.

This linkage of the levers with the bed and between each other makes the radial-swaging machine capable of producing symmetrically shaped parts having various cross-sectional dimensions, for example, stepped shafts.

The radial-swaging machine constructed according to the present invention is relatively simple in design and consequently not expensive to manufacture, it is reliable in operation and practically noiseless.

Other objects and advantages of the radial-swaging machine will become more fully apparent as reference is had to the accompanying drawings wherein a specific embodiment thereof is illustrated, and in which.

Figure 1:
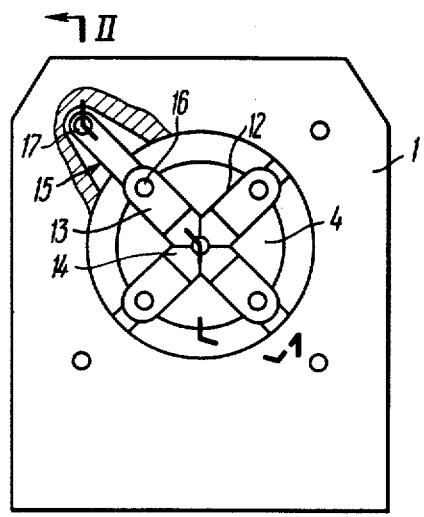
FIG. 1 is a front partially sectional view of the radial-swaging machine according to the invention, in the first version of embodiment.
Figure 2:
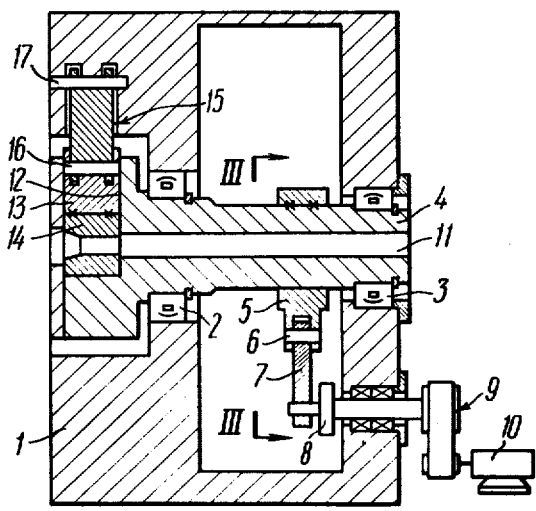
FIG. 2 is a section taken on the line II—II of FIG. 1.
Figure 3:
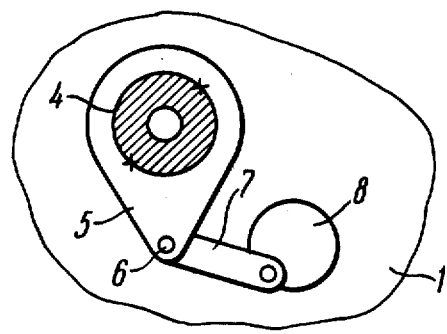
FIG. 3 is a section taken on line III—III of FIG. 2.

The radial-swaging machine has a bed 1 (FIG. 1, 2, 3) carrying a spindle 4 seated in bearings 2 and 3. Rigidly fixed to the spindle 4 is a link 5 which by means of an axle 6 is pivoted to a connecting rod 7 secured onto a crankshaft 8. By means of belt drive 9 this shaft is connected to an electric motor 10. Said shaft 8 and connecting rod 7 convert the rotary motion produced by the electric motor 10 into the oscillating motion of the spindle 4.

The spindle 4 is provided with an axial passage 11 for a billet (not shown) to advance through this passage in the process of its treatment, and radial slots 12.

These slots accomodate slides 13. Fixed to the end of each slide 13, facing the axis of the spindle 4 is a striking head 14 which is a replaceable working tool to bring its action to bear on the billet when the latter is being processed.

The opposite end of each slide 13 is adapted to cooperate with a mechanism 15 bringing reciprocating motion to these slides in the course of the oscillation of the spindle 4. The mechanism 15 consists of levers whose number is equal to that of the slides 13. Each of these levers is positioned adjacently to the corresponding slide 13 and with its one end by means of an axle 16 is pivotally connected to the slide 13 while with its other end through an axle 17 is pvioted to the bed 1. This linkage of the slides 13 with the bed 1 successfully converts the oscillating motion of the spindle 4 into the reciprocating motion of the slide 13. This type of linkage is simple to engineer and produce and affords a substantial reduction in the noise level. This layout of the radial swaging machine is designed for swaging parts of a cross-section constant in shape and dimensions over the entire length of the part.

Figure 4:
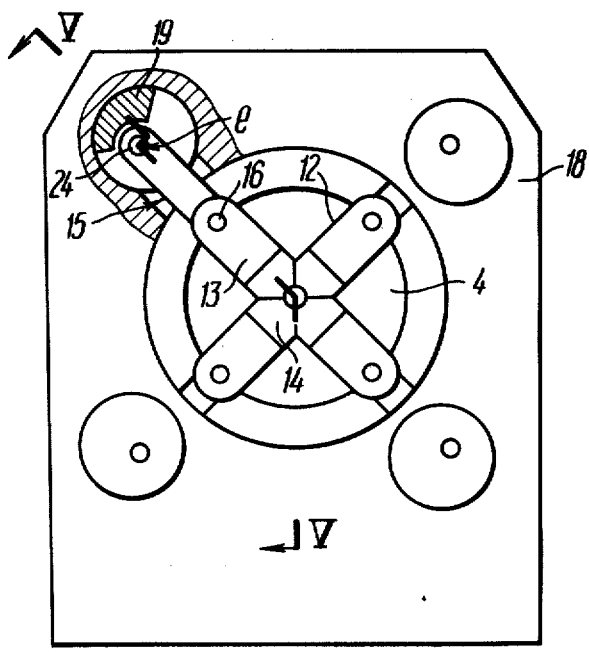
FIG. 4 is a front partially sectional view of the radial-swaging machine according to the invention, in the second version of embodiment.
Figure 5:
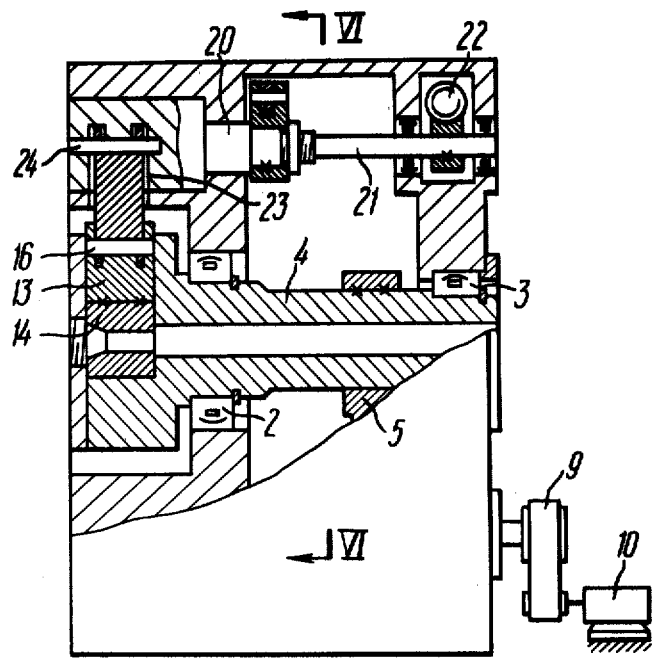
FIG. 5 is a section taken on the line V—V of FIG. 4.

To adapt this machine to produce parts asymmetrical in shape and various in cross-section, each lever 15 is connected to the bed 18 (FIG. 4, 5) via an eccentric 19. The eccentric 19 is installed in a bore made in the bed 18 for possible turning around its geometric axis 20 through an angle ensuring displacement of the slide 13 through a distance which is determined by the difference between the maximum and minimum dimensions of parts processed on this machine.

For fixed turning each eccentric 19 via a shaft 21 is connected to a warm gearing 22 which in turn is kinematically connected to a separate motor (not shown).

To connect the lever 15 to the eccentric 19, the latter has a slot 23 and a blind hole to locate an axle 24 which pivots the lever 15 to the eccentric 19. The above hole is positioned away from the geometric axis 20 through a value $e$ which is an eccentricity chosen with respect to the value of the difference between the maximum and minimum cross-sectional dimensions of parts to be processed.

Figure 6:
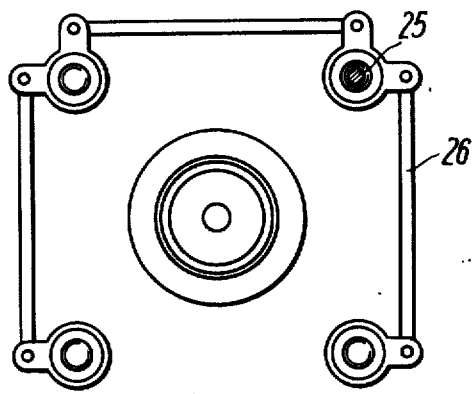
FIG. 6 is a section taken on the line VI—VI of FIG. 5 when the eccentrics are kinematically interlinked.

If the machine is to be used for processing parts symmetrical in shape and various in cross-sectional dimensions, such as stepped shafts, the eccentrics 25 (FIG. 6) should be kinematically interconnected. This kinematic connection is effected by means of rods 26 where each rod consecutively connects together two adjacent eccentrics 25. One of the eccentrics 25 is connected to a drive similar in design to the drive 22 shown in FIG. 4, whose torque is simultaneously transmitted to the eccentrics 25.

The radial-swaging machine operates as follows.

The electric motor 10 when switched on rotates the crankshaft 8 through the belt drive 9. The crankshaft 8 via the connecting rod 7 and the link 5 brings oscillating motion to the spindle 4. As the lever 15 is pivotally secured on the bed 1 by means of the axle 17 and is also pivoted to the slide 13 by means of the axle 16, the oscillating motion of the spindle 4 is converted into the reciprocating motion of the slide 13. Displacement of the slide 13 towards the centre of the spindle 4 causes deformation of the billet (not shown) by the striking head 14 fixed on the slide 13.

Thus swaging is effected of the billet being symmetrical in shape and constant in its cross section.

To process parts being asymmetrical in shape the eccentric 19 of each slide is turned through an angle which determines the extreme positions of the slide.

This turning is effected by the worm gearing 22.

Further processing of the billet takes place similarly to that of the symmetrically shaped billet as described above.

To process billets, such as symmetrically shaped stepped shafts, all eccentrics 25 are fixedly turned by means of the worm gearing 22 and rods 26 through a similar angle which determines the extreme positions of the slides 13.

In all other respects the machine operates the same as that described above.

We claim:

1. A radial-swaging machine, comprising: a bed; a spindle mounted on said bed; a drive connected to said spindle to bring oscillating motion to it; said spindle incorporating an axial passage for the advancement of a billet being swaged, and radial slots; slides accomodated in said slots; striking heads fixed on those ends of said slides which face said axial passage of the spindle; levers whose number is equal to that of said slides, each of these levers located adjacently to its own slide and with its one end is pivotally connected to the latter while with the other, to said bed; said levers bringing reciprocating motion to said slides carrying said striking heads in said slots in the course of the oscillating motion of the spindle.

2. A radial-swaging machine, comprising: a bed; a spindle mounted on said bed; a drive connected to said spindle to provide its oscillatory motion; said spindle having an axial passage for the advancement of the billet being swaged and radial slots; slides accommodated in said slots; striking heads fixed on the ends of said slides facing the axial passage of the spindle; levers of a number equal to the number of said slides, each one of said levers being located adjacently to respectively its own slide and having one end thereof hinged to said slide and the other end connected to said bed through an eccentric for each lever providing a control of the slide position in the course of swaging the billet, and said eccentric having a self-contained drive.

3. A radial-swaging machine as set forth in claim 2, wherein the eccentrics connecting the ends of each of the levers to the bed being kinematically connected to each other and being provided with a common drive.

* * * * *